Aug. 24, 1937.  R. K. HALLUM  2,090,793
COOKING DEVICE
Filed April 17, 1936
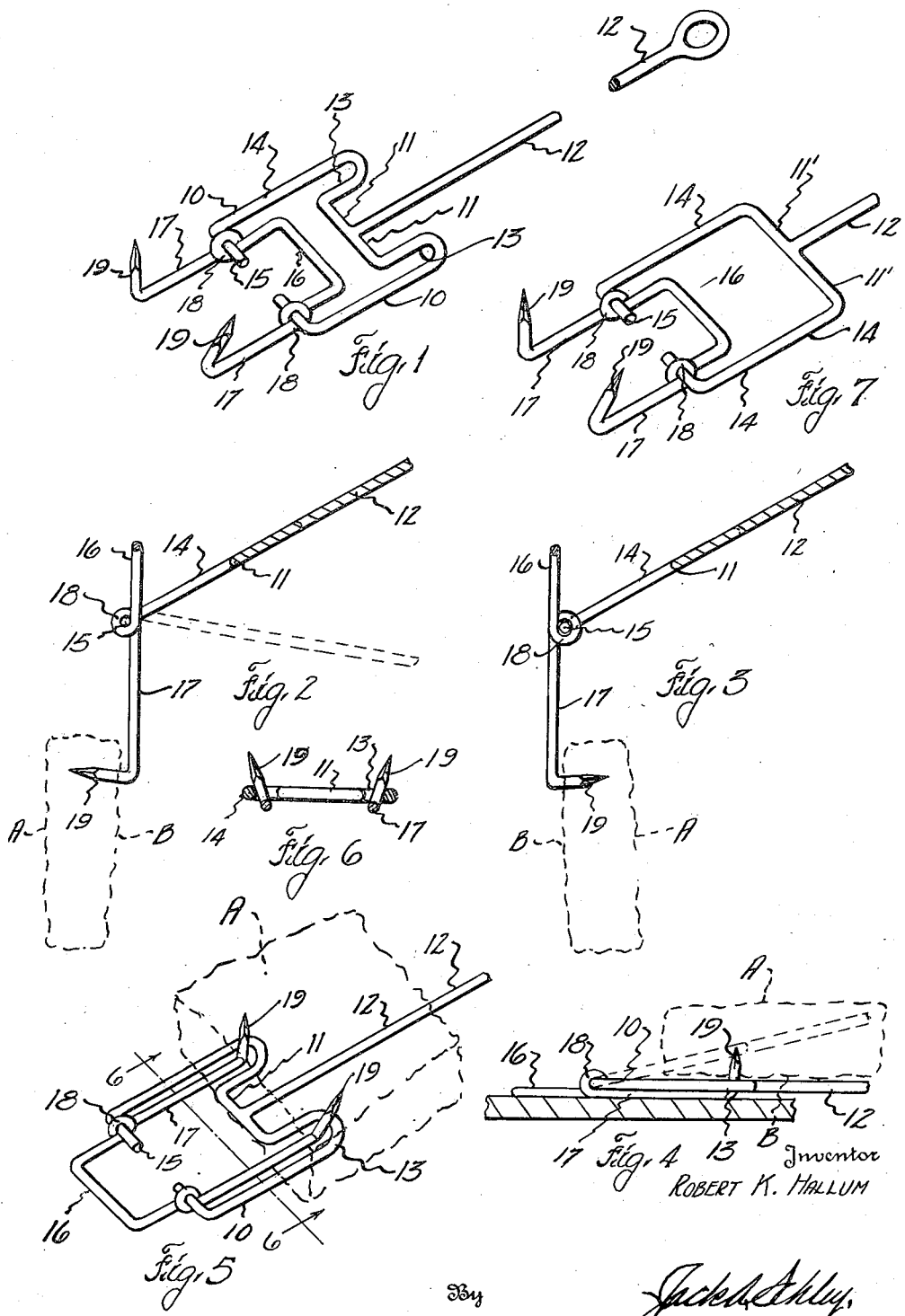
Inventor
ROBERT K. HALLUM Patented Aug. 24, 1937

2,090,793

UNITED STATES PATENT OFFICE 2,090,793

COOKING DEVICE

Robert K. Hallum, Brownwood, Tex.

Application April 17, 1936, Serial No. 74,869

7 Claims. (Cl. 53—5)

This invention relates to new and useful improvements in cooking devices.

One object of the invention is to provide an improved cooking device which is particularly adapted to use in broiling, or toasting, of meat or other food articles by means of an open fire.

An important object of the invention is to provide an improved cooking device which is so constructed that the food to be cooked may be placed thereon and may be cooked on both sides without removing the same from the device.

Another object of the invention is to provide a cooking device having means for receiving a food article to be cooked, with means for readily removing the article from the device without touching said article with the hands.

A further object of the invention is to provide an improved cooking device which is constructed of a minimum number of parts, whereby it may be easily manipulated and also whereby it may be readily disassembled for cleaning purposes.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a perspective view of a cooking device, constructed in accordance with the invention, Figure 2 is a transverse, vertical, sectional view, showing the device in position, cooking one side of the food article, Figure 3 is a similar view, showing the device in position, cooking the opposite side of the article, Figure 4 is a similar view, showing the position of the device, prior to removing the article therein, Figure 5 is a perspective view, with the parts in the position shown in Figure 4, Figure 6 is a transverse, vertical sectional view, taken on the line 6—6 of Figure 5, and Figure 7 is an isometric view of a modified form of the invention.

In the drawing, the numeral 10 designates a frame having a general yoke shape. The frame is preferably formed of a single piece of heavy wire, or other suitable material, and is bent to form a transverse supporting bar 11 at its rear central portion. A suitable elongate handle 12, which may be made integral with the bar, extends therefrom.

On each side of the bar 11, the frame is bent rearwardly, and then rebent forwardly to form open loops 13 at each side of the rear end thereof. The end portions of the frame extend forwardly in parallel relation to form spaced arms 14, which have inwardly extending studs 15 at their extreme outer ends.

A U-shaped member 16 formed of the same material as the frame 10, has its arms 17, which extend parallel to each other, bent upon themselves to form loops 18. The loops 18 receive the studs 15 whereby the member 16 is pivoted between the outer ends of the frame (Figure 1). The outer ends of the arms 17 of the member 16 are formed with prongs 19 which are disposed at substantially a right angle thereto. These prongs are bent so as to flare outwardly toward the arms 14 of the frame 10, as is clearly shown in Figure 6.

It is noted that the width of the pivoted member 16 is less than the width of the frame. Also the member is pivoted off-center, whereby the closed end of said pivoted member is shorter in length than the arms 10 of the frame, whereby this portion of the pivoted member may freely swing within the frame 10. However, the arms 17 of the member which have the prongs 19, extend a greater distance from the studs than the transverse bar 11, and therefore, when the member is swung so that the arms 17 thereof overlie the frame 10, the ends of said arms enter the open loops 13 (Figure 5). The arms are prevented from swinging downwardly through the loops by the engagement of the flared prongs 19 with the sides of said loop.

In the use of the device, the handle is held at a slight angle with the frame 10 at its lower end. Due to the fact that the member is pivoted off-center, the end of said member having the prongs 19 thereon will swing downwardly because of its heavier weight. This position is clearly shown in Figure 2, the prongs 19 being directed outwardly.

Meat, bread, or any other food article to be broiled or toasted by means of an open fire, is then engaged on the prongs 19 as is shown by dotted lines in Figure 2. By holding the device adjacent the fire, the side A of the article will be cooked. To present the opposite side B to the fire, it is only necessary while maintaining the handle at an inclination, to rotate the handle one-half a revolution, which will reverse the position of the member 16 within the frame 10, whereby the prongs 19 will be directed inwardly instead of outwardly. This position is clearly shown in Figure 3. The reversal of the relative position of the member 16 will present the other side B of the food article to the fire.

After the food article is thoroughly cooked and it is desired to remove the same from the device, the member 16 is swung to the position shown in Figures 4 and 5, whereby the ends of the arms 17 of the member 16 enter the open loops 13 of the frame. The member may be swung to this position by properly manipulating the handle 12. When both sides of the food article are cooked, the member is restored to the position shown in Figure 2 with the prongs 19 extending outwardly. The handle 13 is then swung downwardly to substantially the position shown by dotted lines C, the member 16 remaining in a vertical position. With the handle lowered in this manner, it is then rotated one-half a revolution, the ends of the arms 17 of said member 16 will engage within the open end of the loops 13 of the frame. Due to the flared prongs 19 and also to the food article engaged thereon, the parts will remain in this position.

The frame 10 and overlying member 16 are then placed on a flat surface and the handle 12 is lifted upwardly. This upward lifting of the handle caused the frame 10 to swing upwardly pivoting on the studs 15 (dotted lines Figure 4). The member 16 is, of course, lying flat at this time. As the frame 10 swings upwardly, the sides of the open loops 13 of said frame move upwardly on each side of the flared prongs 19. The natural spring or tension of the prongs permit them to be swung inwardly by the frame to permit said frame to pass. As the loops 13 move past the prongs, said loops engage the food article engaged on the prongs, and readily remove the same with a prizing action. It is noted that the provision of the loops permit positive removal of an article engaged on the prongs, for a shearing of said article from both sides of the prongs is had.

From the above, it will be seen that with the device herein shown, a food article may be placed thereon, and then cooked on both sides and positively removed without touching the same with the hands. Also, there are only two parts to the device, and the member 16 may be readily and easily removed from the frame at any time for cleaning or other purposes.

It is noted that although the open loops 13 at the rear end of each side of the frame, provide efficient removal of the article from the prongs, they could be eliminated. In such case, the frame is constructed as shown in Figure 7, wherein the transverse bar 11' connects the rear ends of the side arms 14 of the frame. The ends of the arms 17 of the member 16 swing into the corner formed by the intersection of the bar 11' and arms 14, and the prongs 19, being flared, overlie the arms. The operation of this form is exactly the same as the first form, the only difference being that instead of the open loop stripping the article from the prongs, the single side arm 14 performs this operation.

What I claim and desire to secure by Letters Patent, is:

1. A cooking device including, a frame, a food supporting member pivoted intermediate its ends within said frame whereby a portion thereof depends from the frame so that the food article supported thereon may be presented to a fire or other cooking medium, and means on the frame for removing said article from the member.

2. A cooking device including, a substantially yoke-shaped frame, a food supporting member pivoted intermediate its ends within the frame, means on said member for receiving a food article to be cooked, and means on the frame for removing said article from the member.

3. A cooking device including, a substantially yoke-shaped frame, a food supporting member pivoted intermediate its ends within the frame, prongs on one end of said member for receiving a food article to be cooked, and means on the frame for removing said article from the prongs of said member.

4. A cooking device including, a frame, a food supporting member pivoted intermediate its ends and nearer one end thereof within the frame, prongs on said member for receiving a food article to be cooked, and means on the frame for removing the article from said prongs.

5. A cooking device including, a substantially yoke-shaped frame, a U-shaped member pivoted intermediate its ends and nearer one end thereof to the outer ends of the arms of said member, means on the open end of said member for receiving a food article to be cooked, and means on the frame for removing said article from the member.

6. A cooking device including, a substantially yoke-shaped frame, a U-shaped member pivoted intermediate its ends and nearer one end thereof to the outer ends of the arms of said member, and flared prongs on the open end of said member for receiving a food article to be cooked, the prongs being arranged to engage the frame when the member is swung to overlie the frame, whereby upward movement of the frame acts to strip the food article from said prongs.

7. A cooking device including, a substantially yoke-shaped frame, open loops formed at the rear end of the frame, a U-shaped member pivoted off center to the outer ends of the arms of said member, and flared prongs on the open end of said member for receiving a food article to be cooked, the member being of such size that when the member is swung into alignment with the frame, the prongs enter the open loops and due to the flare thereof engage the sides of said loop, whereby upward movement of the frame strips the food article from said prongs.

ROBERT K. HALLUM.